J. ALTRICHTER.

MEANS FOR OPENING AND CLOSING CARRIAGE WINDOWS.

APPLICATION FILED SEPT. 15, 1911.

Reissued July 28, 1914.

13,780.

4 SHEETS—SHEET 1.

WITNESSES:

E. J. Meurling

Irene Lefkowitz

INVENTOR

JOHANN ALTRICHTER.

BY

Townsend & Decker

ATTORNEYS

J. ALTRICHTER.
MEANS FOR OPENING AND CLOSING CARRIAGE WINDOWS.
APPLICATION FILED SEPT. 15, 1911.
Reissued July 28, 1914.
13,780.
4 SHEETS—SHEET 2.
Fig. 3.
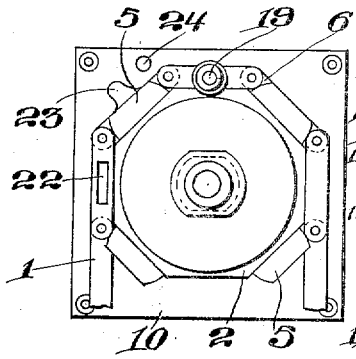
Fig. 5.
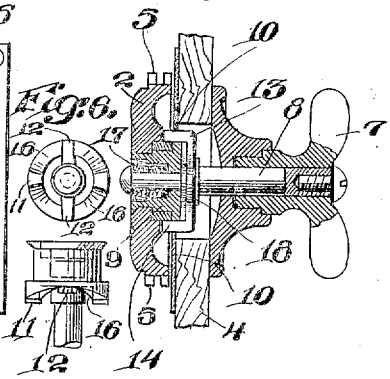
Fig. 6.
Fig. 4.
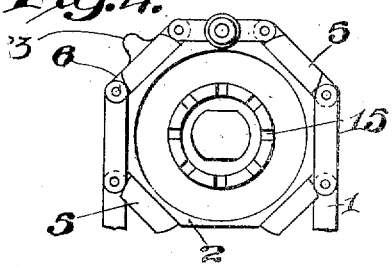
Fig. 7.
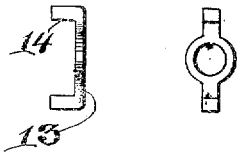
Fig. 8.
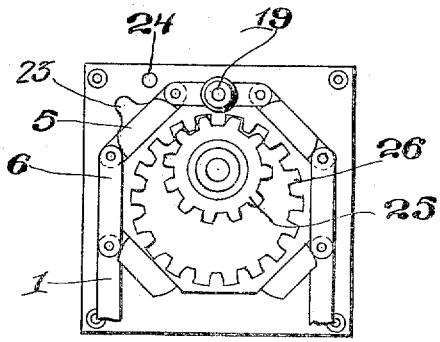
WITNESSES:
E. J. Meurling
Irene Lefkowitz
INVENTOR
JOHANN ALTRICHTER.
BY
Townsend & Decker
ATTORNEYS

J. ALTRICHTER.

MEANS FOR OPENING AND CLOSING CARRIAGE WINDOWS.

APPLICATION FILED SEPT. 15, 1911.

Reissued July 28, 1914.

13,780

4 SHEETS—SHEET 3.

WITNESSES

Erik Meurling

Irene Lefkowitz

INVENTOR

JOHANN ALTRICHTER.

BY

Tomsend & Decker

ATTORNEYS

J. ALTRICHTER.

MEANS FOR OPENING AND CLOSING CARRIAGE WINDOWS.

APPLICATION FILED SEPT. 15, 1911.

Reissued July 28, 1914.

13,780.

4 SHEETS—SHEET 4.

WITNESSES:

E. J. Meurling.

Lene Lefkowitz

INVENTOR

JOHANN ALTRICHTER.

BY

Townsend & Decker

ATTORNEYS

UNITED STATES PATENT OFFICE.

JOHANN ALTRICHTER, OF JUDENBURG, AUSTRIA-HUNGARY, ASSIGNOR, BY MESNE ASSIGNMENTS, TO PERFECT WINDOW REGULATOR COMPANY, A CORPORATION OF MAINE.

MEANS FOR OPENING AND CLOSING CARRIAGE-WINDOWS.

Specification of Reissued Letters Patent. Reissued July 28, 1914.

13,780.

Original No. 948,603, dated February 8, 1910, Serial No. 431,446. Application for reissue filed September 15, 1911. Serial No. 649,578.

*To all whom it may concern:*

Be it known that I, JOHANN ALTRICHTER, a subject of the Emperor of Austria-Hungary, and a resident of Judenburg, Crownland, Styria, Austria-Hungary, have invented certain new and useful Improvements in Means for Opening and Closing Carriage-Windows, of which the following is a specification.

This invention relates to improvements in window operating devices particularly for carriage windows, the object being to simplify the operation of and the mechanism for opening and closing windows of this type and for locking the same in any position.

The invention consists in the combinations of parts and details of construction hereinafter more particularly described and then specified in the claims.

Figure 1:
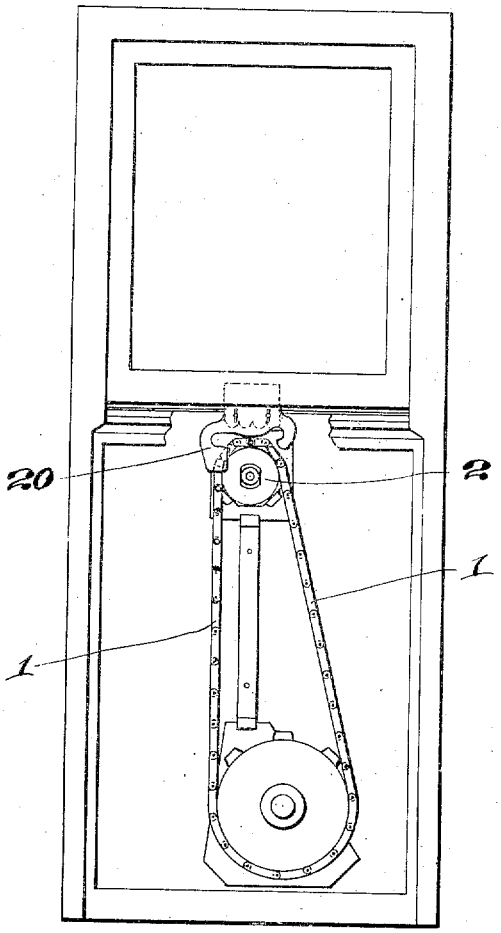
Figure 2:
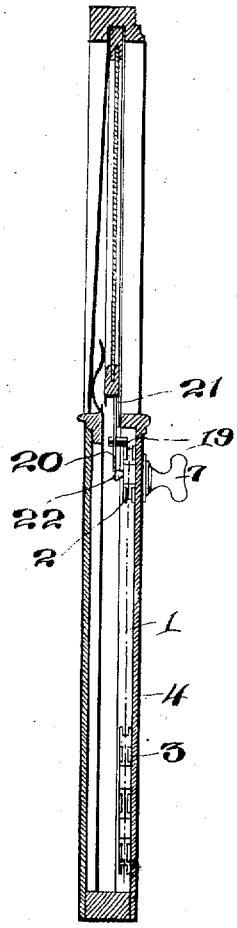
Figure 10:
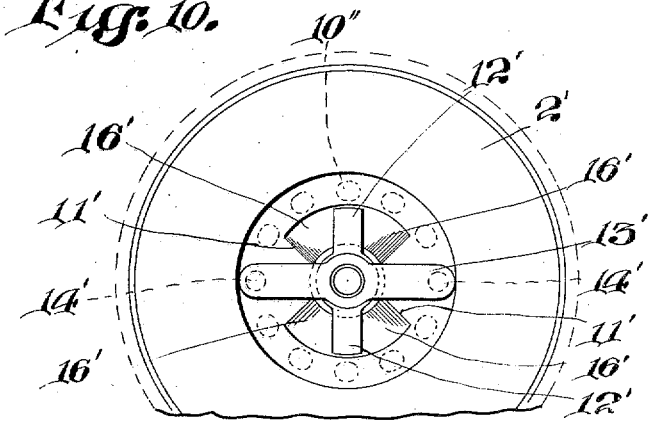
Figure 9:
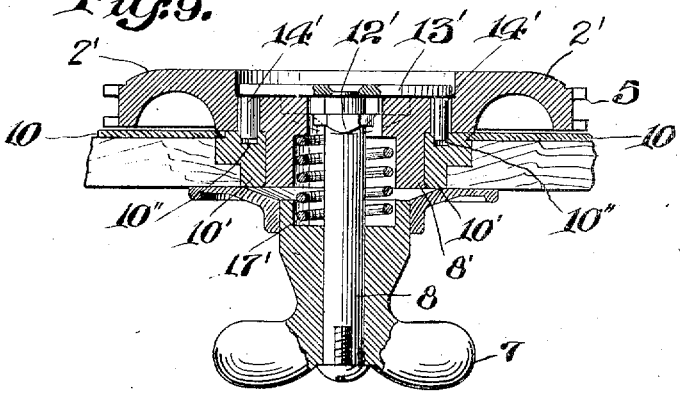
Figure 11:
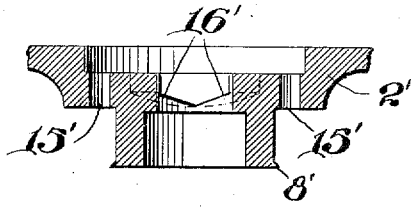
Figure 12:
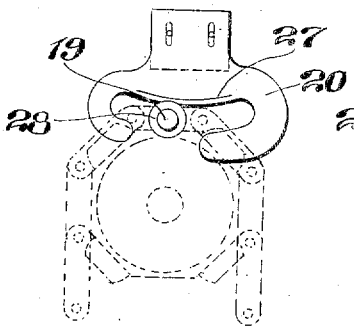
Figure 13:
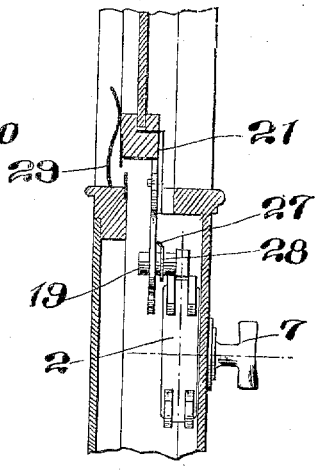
Figure 14:
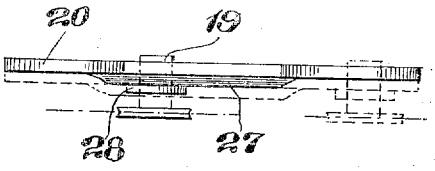

Referring to the drawings, Figure 1 is a front elevation of a carriage window with raising and lowering mechanism applied thereto, parts being broken away. Fig. 2 is a vertical transverse cross-section through the same. Figs. 3 and 4 are respectively front and rear elevations of the chain pinion. Fig. 5 is a vertical section through the chain pinion with the locking arrangement for securing the apparatus in position. Fig. 6 shows a plan and side elevation of the unlocking and coupling device. Fig. 7 shows front and side elevation of the locking fingers detached from the rest of the apparatus. Fig. 8 shows an alternative form of the pinion. Fig. 9 is a section of an alternative form of the locking device for securing the pinion in position. Fig. 10 is a rear elevation of the device shown in Fig. 9. Fig. 11 is a cross-section through the same. Figs. 12 to 14 show respectively a front elevation, a cross-section, and a plan of another form of connecting or cam-plate to be attached to the window.

The arrangement illustrated comprises two chain or sprocket wheels 2 and 3, connected by a chain 1, and supported in the side of the carriage 4, which at the same time is designed to receive the window when lowered. The chain wheels are preferably provided with teeth arranged in parallel pairs 5, Figs. 3, 4, 5, 9, 11, between which the links 6 of the driving chain preferably formed of thin plate set on edge can lodge, whereby the chain is more efficiently borne and guided. The upper chain wheel or pinion 2 is driven direct by turning the handle 7, which is slid over the pin or spindle 8, Figs. 5 and 9.

In Fig. 5, the chain pinion 2 is firmly jointed to a box 9, which can revolve in the bearing plate 10 and is provided on its front face with two projections or shoulders 11, placed diametrically opposite each other, and against which two oppositely projecting arms 12, fixed to the pin 8, are made to bear when the handle 7 is turned, so that the chain pinion is made to revolve with the handle. But before this can be done the chain pinion must be released, by disengaging the locking arrangement which secures the chain pinion in position. This locking arrangement consists of a bolting device 13, loosely slid over the pin 8, and which by means of two projections 14 (Figs. 5 and 6) protruding through recesses in the bearing plate 10, catches into suitable notches 15 in the chain pinion (Fig. 4). For the purpose of bringing the locking arrangement into action the box 9 carrying the chain pinion is provided, on the side facing toward the extensions or arms 12 of the pin 8, on either side of the projections 11 (Fig. 6) two slide-faces or cams 16 ascending toward the latter projections, and against which the arms 12 of the pin are constantly pressed, by a spring 17 inserted in the box 9. When the pin 8 is turned, its arms 12 ride on the slanting faces 16 and thus push the pin forward, so that the bolting device 13 is also pushed forward and its projections are disengaged from the notches of the pinion, so that when the pin 8 is turned farther, the pinion will be made to revolve with the pin by the arms 12 of the pin bearing against the shoulders or projections 11 of the pinion. As soon as the handle 7 is released the pinion is locked again in position, by means of the spring 17 which forces the pin 8 backward, and at the same time the bolting device is also carried back, by a shoulder 18 on the pin, until it catches into the notches of the pinion. At the same time the pin is made to revolve, by its arms 12 riding on the cams or slanting faces 16, so that it is brought back again into the position shown in Fig. 6, in which the arms 12 are half-way between the two projections 11, so that, when the handle 7 is once more turned the bolting device is in the first place released, and thereafter the pinion is set in motion.

According to Figs. 9 to 11, the chain pinion 2′, with its nave 8′, is borne so as to revolve in a box 10′ belonging to the bearing plate 10. The projections or shoulders 11′, as well as the slanting slide faces 16′, are arranged on the back of the pinion 2′ itself. The bolting device 13′ is fitted loosely upon the farther end of the pin 8 and engages by means of its locking pins 14′, (protruding through two holes 15′ in the pinion 2′,) the notches 10″ of the bearing 10′. The spring 17′, which presses the arms 12′ of the pin 8 against the slide faces 16′ is arranged between the nave 8′ of the pinion and the handle 7, both nave and pinion being suitably recessed. When the pin 8 is turned, its arms 12′ ride on the inclined faces or cams 16′, causing the pin 8 to be displaced longitudinally, backward, while at the same time the bolt arrangement 13′ is also displaced backward, and its locking pins 14′ are disengaged from the notches 10″ of the bearing box 10′, so that, when the pin 8 is turned farther and its arms 12′ are made to bear against the projections or shoulders 11′, the pinion 2′ is made to revolve. As soon as the handle 7 is released the pinion 2′ is locked again by the spring 17, essentially in the same way as in the locking arrangement first described.

The moving of the window is effected in the known manner by means of the lifting-pin or projection 19 on the chain 1, which catches into the connecting plate 20 attached to the carriage window. Preferably this plate 20 is attached to the window by means of a second connecting-plate 21, Figs. 2 and 13. These two connecting plates are arranged displaceably so that they can be adjusted and fixed in the desired position relatively to each other, whereby the connecting-plate, acted upon by the projection or lifting-pin on the chain, can be adjusted at will while attached to the window.

The beveled shoulder 22 carried by the chain 1 engages the surface of the plate 20 and presses or forces the window transversely to the plane thereof and against the weather rail when the window is in raised position, the stop 23 also carried by the chain 1 at the same time striking against the pin 24 arranged on the bearing plate 10 of the chain wheels, thereby limiting any further upward movement of the window.

For heavy windows the driving wheel fitted with double teeth, Fig. 8, is provided in a known manner with an inside gearing 26 into which the pinion 25 gears, which pinion is otherwise constructed as shown in Fig. 5 or 9.

The moving or forcing of the raised window transversely to its plane and toward the weather rail is preferably, according to this invention attained by giving the connecting-plate 20 a peculiar form as by providing it along its guiding edge, which is acted upon by the projection 19, Figs. 12 to 14, with a bearing fillet or surface cam 27, preferably beveled off at both ends and against which a projection or shoulder 28 of the lifting pin 19 bears when the window is raised, the lifting pin being attached preferably to the body of a link of the chain 1. The effect of this construction is to press the connecting or cam-plate and the window carrying it outward or transversely to the plane of the window on continued rotation of the wheel 2 after the window has been closed, and also to force the window over the weather rail. The window will then remain in this position until the shoulder 28, in the course of its travel with the lifting pin 19 in the reverse direction, reaches the other end of the fillet or cam 27, when the window, already lowered a little, is again forced inward and along the beveled surface of the cam or fillet by a pressure spring 29. Thus, in the form shown in Figs. 12 to 14, the lifting-pin is also provided with the means for forcing the window transversely to its plane and over the weather rail, whereby the mechanism is more simple and positive than in the form shown in Figs. 1 and 2.

What I claim as my invention is:—

1. In an arrangement for operating windows by means of chain gear, means for operating and locking the same and comprising a chain pinion provided with notches and having a driving shoulder, cam surfaces leading to said shoulder, a rotatable spindle provided with an operating handle, arms carried by said spindle and adapted to ride on said cam surfaces and a bolting device on said spindle and provided with projections for engaging the notches in said pinion.

2. In a device for moving and fastening carriage windows with chain gear, a chain pinion having on one face shoulders (11, 11′) and slanting surfaces (16, 16′) on both sides of said shoulders ascending toward the same, a spindle (8) adjustable longitudinally and adapted to rotate the chain pinion, said spindle being provided at its inner end with perpendicular arms (12, 12′), a coiled spring (17, 17′) surrounding the inner end of the spindle and adapted to press the said spindle arms (12, 12′) against the said slanting surfaces of the chain pinion, a bolting arrangement (13, 13′), rotatably seated upon the spindle and having projections (14, 14′), in combination with notches on the chain pinion adapted to receive the projections (14, 14′).

3. In a window operating apparatus, driving mechanism, an operating handle therefor, a plate secured to and depending from the window and a connection between said mechanism and said plate and adapted to raise the window and on a continued movement of said handle after the window is closed to force the window over the weather rail.

4. A window operating apparatus comprising a chain drive, a plate secured to the window and provided with a cam on its surface and a lifting-pin carried by the chain and provided with a portion adapted to ride on the cam of said plate to force the window transversely to its plane.

5. In a window-operating apparatus, the combination of a chain drive, a plate secured to the window and provided with a cam on its surface, a lifting-pin attached to the body of a chain link and connected with said plate to raise the window and provided with a part adapted to ride on the cam of said plate and force the window transversely to its plane.

6. In a window operating apparatus, the combination with the weather rail, of driving mechanism for raising and lowering the window and a plate secured to the window and adapted to raise and lower the same, said plate being provided with a surface cam adapted to be engaged by the raising and lowering means and thereby to move the window transversely to its plane.

7. A window operating apparatus comprising a cam plate secured to the window and means engaging said plate and adapted to raise and lower the window, said means acting on the cam of said plate to force the window transversely to the plane thereof and over the weather rail.

8. In a window operating apparatus, the combination of a chain drive, a cam plate secured to the window and a cam follower carried by the chain drive, said cam follower being adapted to coöperate with the cam plate to raise and lower the window and by a movement across said plate move it transversely to the plane thereof.

9. In a window operating apparatus, the combination of a plate secured to the window, a chain drive for said plate, a lifting pin connecting said plate and chain drive, a cam surface on said plate and means attached to said lifting pin coöperating with said cam surface to force the window transversely to the plane thereof.

10. In a device for fastening and moving carriage windows, a chain drive, a projection (19) fixed to said drive, a plate (20) fastened to the window and provided with a guiding curve for the said projection, said plate having along the guiding curve a bearing fillet (27), in combination with a shoulder (28) on said projection adapted to engage the bearing fillet, substantially as set forth.

11. In a device for operating carriage windows, a driving mechanism, a lifting-pin carried by said mechanism, a plate fastened to the window and provided with a guiding curve for said lifting-pin, a cam along said guiding curve and a shoulder on said lifting-pin adapted to engage said cam.

12. A window operating apparatus comprising a plate provided with a cam surface on the face thereof, means coöperating with said plate and adapted to raise and lower the window, said means being provided with a part acting on said cam and adapted to move the window transversely to the plane thereof and over the weather rail.

Signed at Vienna in the county of Vienna and State of Austria, this 30 day of August, 1911.

JOHANN ALTRICHTER.

Witnesses:
FRANZ FOLGER,
AUGUST FUGGER.